March 30, 1965 A. WEBER 3,175,243
CURTAIN SUSPENSION GLIDER AND HOOK
Filed Sept. 10, 1962 2 Sheets-Sheet 1

INVENTOR
ALEXANDER WEBER
ATTY.

March 30, 1965  A. WEBER  3,175,243
CURTAIN SUSPENSION GLIDER AND HOOK
Filed Sept. 10, 1962  2 Sheets-Sheet 2
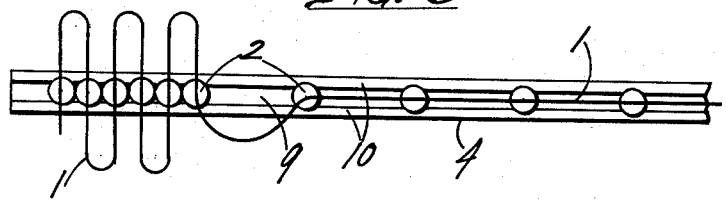
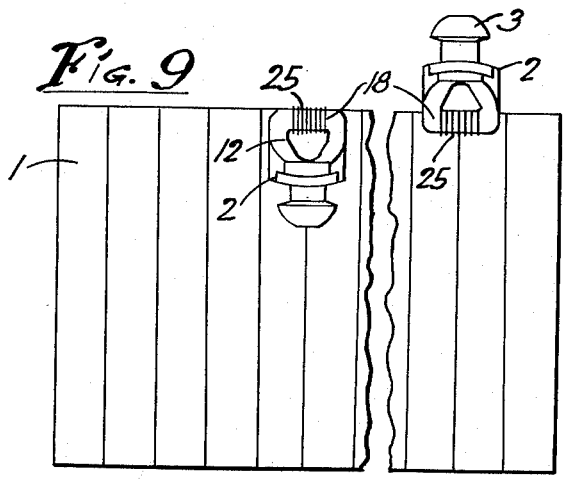
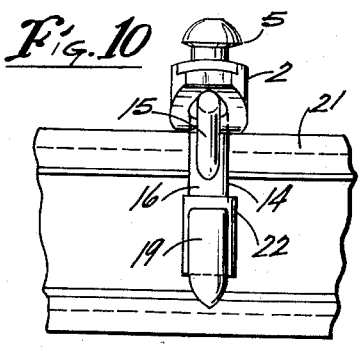
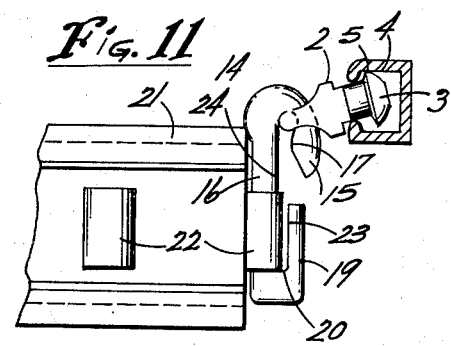
INVENTOR
ALEXANDER WEBER
ATTY.

United States Patent Office 3,175,243
Patented Mar. 30, 1965

3,175,243
CURTAIN SUSPENSION GLIDER AND HOOK
Alexander Weber, Zollikofen, near Bern, Switzerland, assignor to Dr. Hans Beer and Mrs. Emma Weber-Horisberger, trading as Firma AWEPA, Zollikofen, near Bern, Switzerland
Filed Sept. 10, 1962, Ser. No. 222,720
8 Claims. (Cl. 16—87.4)

This invention relates to curtain suspension means in the form of slides which are guided in longitudinally slotted hollow profile rails, each slide having a head working in the rail and a neck protruding through a slot in the rail with a suspension ring on its outer end adapted to have a curtain attached thereto. There are various types of curtain suspensions involving rails with longitudinal slots in the bottom or one side, and in either case it is desirable that the curtain be readily separable from the slides to avoid necessity for removal of the latter from the rail, that being especially true of curtains which require washing or cleaning frequently. Yet, the connection of the curtain with the slides should be so dependable as to eliminate likelihood of its release during any movement of the curtain. On the other hand, where the slides are designed to remain in the rail, the connections between curtain and slides often present considerable difficulty, particularly when the slides are easily movable in the rail, and more particularly when, as is frequently the case, it is desirable that the slides be rotatable about the axes of their necks.

The present invention has for its principal object to fulfill all of the aforesaid requirements and at the same time avoid the various difficulties mentioned, the present slide being characterized by the fact that adjacent to the cylindrical head, which is rotatable in the rail, each slide has a reduced cylindrical neck portion with the head serving as a means of support on the slide track of the rail, so that the slide is freely rotatable about the axis of the neck, but that portion of the neck normally protruding from the rail slot is rectangular in section and is slightly narrower than the rail slot so that it is enterable freely therein but not rotatable and will serve therefore to hold the slide against turning relative to the rail, there being shoulders defined also on the rectangular portion of each slide to limit entry of said portion into the rail slot.

The invention is described in greater detail below by reference to an embodiment thereof, the structure and use of which are illustrated in the accompanying drawings, wherein:

FIG. 8 illustrates diagrammatically the procedure of folding the curtain;

FIG. 9 illustrates how the slide can be attached directly to the curtain by stitches;

FIG. 10 is a side view of the hook and slide mounted on a frieze band on a curtain, where the slide is vertically disposed to work in a rail as in FIG. 6, and FIG. 11 shows how the same combination of slide and hook appears when the slide works in a rail as in FIG. 7.

Figure 1:
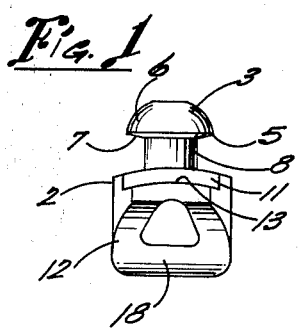
FIG. 1 is a side view of the slide of my invention.
Figure 2:
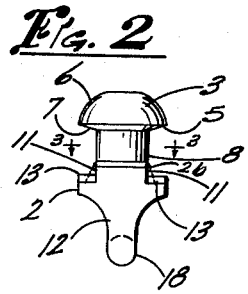
FIG. 2 is a second side view of the slide taken at right angles to FIG. 1.
Figure 6:
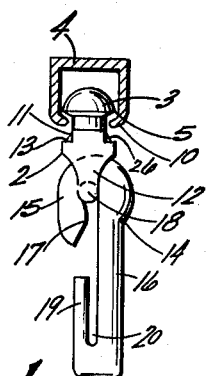
FIGS. 6 and 7 show the slide and hook in position of use in the guide rail, with bottom and side rail slot, respectively.
Figure 7:
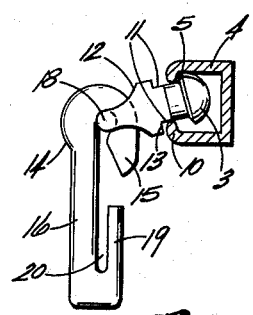

In the so called zigzag suspension of a curtain 1 as it appears in the case of the folded curtain, e.g., according to FIG. 8, each individual slide 2 in the shifting of the curtain from the unfolded closed condition to the folded open condition is subjected to a turn of approximately 90° about the axis of its neck 8. Therefore, the slide 2, as seen in FIGS. 1 and 2, has a mushroom-shaped circular head 3 providing the annular slide surface 5 constituting its support region in the slide rail 4 which is defined more or less as an annular edge between the cambered upper side 6 of the head 3 and the substantially flat bottom 7 thereof. FIGS. 6, 7 and 11 illustrate the edge 5 in supporting engagement in the rail 4. The slide neck 8 adjoining the bottom 7 is cylindrical and in diameter only a little less than the width of the rail slot 9, as appears in FIGS. 6 and 8. Thus, the slide can turn about the axis of its neck 8 with its slide surface 5 resting with minimum friction on the internal track presented by flanges 10 between which the rail slot 9 is defined. The slide 2 has a rectangular portion 11 on the neck 8 which normally protrudes from the rail slot 9, the opposite sides of which are parallel in planes tangential to neck 8 so that portion 11 is narrow enough for free entry into the rail slot 9. The slide is provided on the outer end of the neck with a carrier ring 12 disposed in a plane parallel with the side surfaces of portion 11 and through the axis of the neck, and right angle shoulders 13 are provided at the junction of the ring 12 and portion 11.

Figure 4:
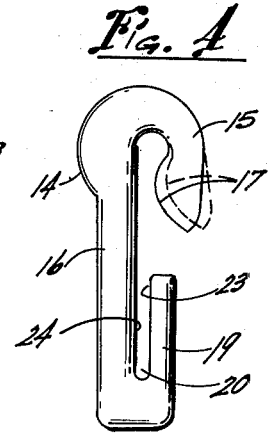
FIG. 4 is a side view of a connection hook used between the slide and a curtain.
Figure 3:
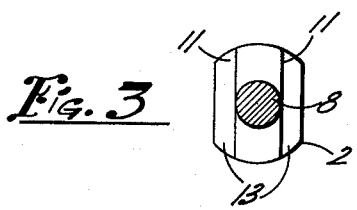
FIG. 3 is a cross-section on line 3—3 of FIG. 2 taken through the neck of the slide, looking downwardly.
Figure 5:
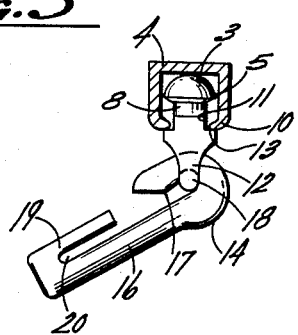
FIG. 5 shows the hook being entered into the slide disposed in a rail, which appears in vertical section.

Double hooks 14 are provided for suspension of the curtain on the slides 2, one hook per slide, and each of these hooks, as shown in FIG. 4, has a ring entering nose or bail portion 15 of tapering form toward the tip and enlarged toward the shank 16 on its inner side, in an arc, as at 17, to define a throat narrower than the cross-pin 18 on the carrier ring 12 on the slide, whereby to insure a good hold for the hook 14 on the ring when attached thereto as seen in FIGS. 5–7 and 11, the nose 15 being yieldable in the plane of the hook transversely of the shank 16 to enable fairly easy attachment to the ring 12 and yet avoid likelihood of a hook becoming unfastened accidentally when attached as shown in FIGS. 5–7. In attaching the hook to the carrier ring 12 of a slide 2 in the rail 4, the slide is pushed into the rail as seen in FIG. 5 until the shoulders 13 engage the rail flanges 10, in which position the side surfaces of rectangular portion 11 lock the slide against turning so that the nose 15 can be readily inserted into the eye of the carrier ring 12 and brought into suspension position by an outward pull. The cross-pin 18 on the ring 12 spreads the nose 15 temporarily relative to the shank 16 in the passing of the pin 18 between the shank and the enlarged inner side 17 of the nose 15. Under the weight of the curtain on the hook 14 the slide 2 then returns to its normal sliding position as in FIG. 6 or 7. The hook 14 can be removed from the carrier ring 12, using a similar procedure for holding the slide 2 against turning during the operation. In the guide rail 4 with lateral rail slot 9, the slide 2 moves into the position shown in FIG. 7, in which it has the slide surface 5 in engagement with the upper rail flange 10 only, while rectangular portion 11 engages the lower rail flange 10 with one of its side surfaces and thus is held against turning about its neck axis.

On the same side of the hook shank 16 facing the nose 15 is a second nose or bail 19 on the other end of the shank directed toward the nose 15, and this second nose 19, which is straight and parallel to the shank 16, defines between itself and the shank a narrower slot 20 of uniform width in which the frieze band 21 (FIGS. 10 and 11) can be suspended by means of a loop 22. These loops 22 are woven into the frieze band at regularly longitudinally spaced intervals, which are made sufficiently short so that the spacing of the normally required number of hooks 14 always is approximately the same multiple of the loop spacing, whereby the hooks may be attached at practically all the places required along the width of the curtain.

The loop 22 engaged in the slot 20 behind the second nose 19 surrounds the hook shank 16 and has an inner width which is too small for simultaneous accommodation of the hook shank and nose but sufficiently large to permit the first nose 15 to slip through. Therefore, the insertion of the double hook 14 in the loop 22 of the frieze band 21 is done by means of the noose 15 during turning of the hook so that afterwards the nose 19 overlaps the loop 22. In order to prevent the hook from turning about the shank axis to any significant extent, the two closely spaced side surfaces 23 and 24 of the nose 19 and the shank 16 defining the slot 20 are flat and substantially parallel to each other.

Instead of using an intermediate double hook, the individual slide can be attached to the curtain directly by means of the cylindrical pin portion 18 of its carrier ring 12 by sewing or stitching, as shown in FIG. 9. In so doing, the slide is placed on the curtain as seen at the left in FIG. 9 and sewn on, as indicated by thread 25, and then turned to the position of use as shown at the right in FIG. 9.

Preferably, the slides and double hooks described are made of synthetic plastics, such as nylon. The two side surfaces of the rectangular portion 11 of the slide could instead of being parallel be inclined wedge-like toward the slide head 3 in order wedgingly to engage the rail flanges 10 when entered in the rail slot 9, as indicated in dotted lines at 26 in FIGS. 2 and 6.

It is believed the foregoing description conveys a good understanding of the objects and advantages of my invention. The appended claims have been drawn to cover all legitimate modifications and adaptations.

I claim:

1. In a curtain suspension, in combination, a hollow rail having a longitudinally extending guide slot therein and slide track surfaces along the opposite sides thereof, and a carrier for attaching of a curtain having a slide head with a reduced neck which protrudes freely through the rail slot, said head being circular and of a greater diameter than the width of said slot and said neck having a circular section, whereby said head normally serves as a rotary support for said carrier on the slide track surfaces in the rail, said carrier being rotatable in said slot and movable endwise on the axis of the neck, said neck having a portion which normally protrudes from the rail slot away from the head portion on the diametrically opposite sides of which there are two substantially parallel flat side surfaces so spaced in relation to spacing of the sides of the rail slot in order to hold said carrier against turning when it is raised to bring said flat surfaces on the neck into engagement with the sides of said slot, and means on said carrier for attachment to a curtain to be suspended.

2. A curtain suspension as set forth in claim 1, in which the head is generally mushroom-shaped, and has a circular edge between the cambered upper side of the head and the flat annular underside of the head.

3. A curtain suspension as set forth in claim 1, in which the last mentioned means comprises a ring on the bottom of the carrier for attachment to a curtain, said ring being disposed in a plane containing the neck axis, the flat side surfaces on the neck's lower portion being on lines parallel with said plane and substantially tangent to the circular section portion of the slide neck.

4. A curtain suspension as set forth in claim 1, in which the last mentioned means comprises a ring on the bottom of the carrier for attachment to a curtain, said ring being disposed in a plane containing the neck axis, the flat side surfaces of the neck's lower portion being on lines parallel with said plane and substantially tangent to the circular section portion of the slide neck, these surfaces converging upwardly for closer engagement in the rail slot when the head is raised endwise into the rail as far as it can go.

5. A curtain suspension as set forth in claim 1, in which the last mentioned means comprises a ring on the bottom of the carrier for attachment to a curtain, the curtain being attached to the carrier ring by means of a hook having a shank portion and a nose portion, the nose portion being resiliently yieldable transversely of the hook shank in the plane of the hook and having an arcuately enlarged inner side normally spaced from the hook shank a distance less than the thickness of that portion of the carrier ring to which the hook its attached.

6. A curtain suspension as set forth in claim 5, including a second hook nose provided on the same side of the shank but on the end opposite to the first hook nose, the second hook nose having only a narrow slot between itself and the shank, which slot is of uniform width and adapted to receive a loop on a frieze band on a curtain.

7. A curtain suspension as set forth in claim 5, including a second hook nose provided on the same side of the shank but on the end opposite to the first hook nose, the second hook nose having only a narrow slot between itself and the shank, which slot is of uniform width and adapted to receive a loop on a frieze band on a curtain, both sides of said slot being defined by flat surfaces, which are substantially parallel to one another.

8. A curtain suspension as set forth in claim 6 in which the loop disposed in the slot of the second hook nose extends around the hook shank and has an inner width which is too small to simultaneously accommodate the hook shank and the second hook nose but permits the first hook nose to be slipped through it.

References Cited in the file of this patent

UNITED STATES PATENTS

| | | |
|---|---|---|
| 2,394,507 | Zarourin | Feb. 5, 1946 |
| 2,815,526 | Rosenzweig | Dec. 10, 1957 |
| 2,848,734 | Ault | Aug. 26, 1958 |
| 2,863,164 | Schesvold | Dec. 8, 1958 |
| 3,021,552 | Perlmutter | Feb. 20, 1962 |
| 3,064,304 | Weber | Nov. 20, 1962 |